US012810496B2

(12) United States Patent
Atkins et al.

(10) Patent No.: US 12,810,496 B2
(45) Date of Patent: Nov. 24, 2026

(54) ENCODING AND DECODING MULTIPLE-INTENT IMAGES AND VIDEO USING METADATA

(71) Applicant: DOLBY LABORATORIES LICENSING CORPORATION, San Francisco, CA (US)

(72) Inventors: Robin Atkins, Vancouver (CA); Jaclyn Anne Pytlarz, San Jose, CA (US); Robert Wanat, San Jose, CA (US); Jake William Zuena, San Jose, CA (US)

(73) Assignee: DOLBY LABORATORIES LICENSING CORPORATION, San Francisco, CA (US)

( * ) Notice: Subject to any disclaimer, the term of this patent is extended or adjusted under 35 U.S.C. 154(b) by 23 days.

(21) Appl. No.: 18/696,025

(22) PCT Filed: Sep. 27, 2022

(86) PCT No.: PCT/US2022/044899
§ 371 (c)(1),
(2) Date: Mar. 27, 2024

(87) PCT Pub. No.: WO2023/055736
PCT Pub. Date: Apr. 6, 2023

(65) Prior Publication Data

US 2025/0054204 A1 Feb. 13, 2025

Related U.S. Application Data

(60) Provisional application No. 63/251,427, filed on Oct. 1, 2021.

(30) Foreign Application Priority Data

Nov. 16, 2021 (EP) .................................... 21208445

(51) Int. Cl.
*G06T 11/10* (2026.01)
*H04N 19/70* (2014.01)

(52) U.S. Cl.
CPC ............ *G06T 11/10* (2026.01); *H04N 19/70* (2014.11)

(58) Field of Classification Search
None
See application file for complete search history.

(56) References Cited

U.S. PATENT DOCUMENTS 6,744,534 B1 6/2004 Balasubramanian
7,023,448 B1 4/2006 Danciu
(Continued)

FOREIGN PATENT DOCUMENTS

EP 3024222 A1 5/2016
JP 2007209025 A 8/2007
(Continued)

OTHER PUBLICATIONS

"Study Group Report High-Dynamic-Range (HDR) Imaging Ecosystem" Sep. 19, 2015 (Sep. 19, 2015), XP055250336. Retrieved from the Internet: URL:https://www.smpte.org/sites/default/fi les/Study Group On High-Dynamic-Range-HDR-Ecosystem.pdf [retrieved on Feb. 16, 2016] 53 pages.
(Continued)

*Primary Examiner* — Tammy Paige Goddard
*Assistant Examiner* — Benjamin Tom Statz

(57) ABSTRACT

Systems and methods for encoding and decoding multiple-intent images and video using metadata. When encoding an image as a multiple-intent image, at least one appearance adjustment may be made to the image. Metadata characterizing the at least one appearance adjustment may be included in, or transmitted along with, the encoded multiple-intent image. When decoding a multiple-intent image, a
(Continued)

system may obtain a selection of a desired rendering intent and, based on that selection, either render the multiple-intent image with the applied appearance adjustments or may use the metadata to invert the appearance adjustments and recover the image pre-appearance adjustments.

20 Claims, 4 Drawing Sheets

(56) References Cited

U.S. PATENT DOCUMENTS

| | | | | |
|---|---|---|---|---|
| 7,535,480 | B2 | 5/2009 | Hartman | |
| 7,796,299 | B1 | 9/2010 | Macleod | |
| 7,965,301 | B1 | 6/2011 | Intwala | |
| 8,014,027 | B1 | 9/2011 | Kulkarni | |
| 8,014,028 | B2 | 9/2011 | Haikin | |
| 8,248,486 | B1 | 8/2012 | Ward | |
| 8,406,569 | B2 | 3/2013 | Segall | |
| 8,520,020 | B2 | 8/2013 | Tin | |
| 9,024,963 | B2 | 5/2015 | Constable | |
| 9,215,440 | B2 | 12/2015 | Greisen | |
| 9,271,011 | B2 | 2/2016 | Jia | |
| 9,275,605 | B2 | 3/2016 | Longhurst | |
| 9,338,389 | B2 | 5/2016 | Messmer | |
| 9,374,589 | B2 | 6/2016 | Ten | |
| 9,412,156 | B2 | 8/2016 | Ward | |
| 9,584,811 | B2 | 2/2017 | Su | |
| 9,593,982 | B2 | 3/2017 | Rhoads | |
| 9,639,935 | B1 | 5/2017 | Douady-Pleven | |
| 9,699,482 | B2 | 7/2017 | Mertens | |
| 10,140,953 | B2 | 11/2018 | Wanat | |
| 10,218,917 | B2 | 2/2019 | Van Der Vleuten | |
| 10,313,687 | B2 | 6/2019 | Stessen | |
| 10,362,337 | B2 | 7/2019 | Mertens | |
| 10,602,126 | B2 | 3/2020 | Rowell | |
| 10,848,729 | B2 | 11/2020 | Borer | |
| 2008/0007748 | A1 | 1/2008 | Borg | |
| 2010/0177247 | A1 | 7/2010 | Sekulovski | |
| 2014/0210847 | A1 | 7/2014 | Knibbeler | |
| 2015/0358646 | A1 | 12/2015 | Mertens | |
| 2016/0005153 | A1 | 1/2016 | Atkins | |
| 2016/0005201 | A1 | 1/2016 | Kunkel | |
| 2016/0156965 | A1* | 6/2016 | Oh | H04N 21/4382 725/116 |
| 2016/0165256 | A1* | 6/2016 | Van Der Vleuten | H04N 9/68 375/240.01 |
| 2016/0254028 | A1 | 9/2016 | Atkins | |
| 2016/0261889 | A1 | 9/2016 | Nakagami | |
| 2017/0006273 | A1* | 1/2017 | Borer | G06T 5/92 |
| 2017/0034520 | A1* | 2/2017 | Rosewarne | H04N 19/1887 |
| 2018/0146197 | A1 | 5/2018 | Yi | |
| 2018/0253884 | A1 | 9/2018 | Burnett, III | |
| 2018/0277580 | A1* | 9/2018 | Chiang | H10F 39/8053 |
| 2019/0164262 | A1 | 5/2019 | Cellier | |
| 2020/0275126 | A1 | 8/2020 | Minoo | |
| 2020/0294304 | A1 | 9/2020 | Jeong | |
| 2020/0366943 | A1 | 11/2020 | Van Der Vleuten | |
| 2020/0380938 | A1* | 12/2020 | Greenebaum | G09G 5/06 |

FOREIGN PATENT DOCUMENTS

| | | | | |
|---|---|---|---|---|
| JP | 4677699 | B2 * | 4/2011 | H04N 1/6086 |
| JP | 2016010013 | A | 1/2016 | |
| WO | 2018031572 | A1 | 2/2018 | |
| WO | WO-2018160883 | A1 * | 9/2018 | H04N 1/6066 |
| WO | WO-2019050972 | A2 * | 3/2019 | H04N 19/70 |
| WO | 2020264409 | A1 | 12/2020 | |
| WO | 2021212072 | A1 | 10/2021 | |
| WO | 2021222310 | A1 | 11/2021 | |
| WO | 2024020356 | A1 | 1/2024 | |

OTHER PUBLICATIONS

Andrivon (Technicolor) Pet Al: “SEI message for Colour Mapping Information”, 17. JCT-VC Meeting; Mar. 27, 2014-Apr. 4, 2014; Valencia, 14 pages.

Dai Min (Maggie) et al: “An overview of end-to-end HDR” Proceedings of SPIE; [Proceedings of SPIE ISSN 0277-786X vol. 10524], SPIE, US, vol. 10752, Sep. 17, 2018 (Sep. 17, 2018) , pp. 107520Z-107520Z, XP060110666. 13 pages.

Description of Exif file format, retrieved “https://www.media.mit.edu/pia/Research/deepview/exif.html 13/” on Aug. 30, 2021, 13 pages.

Exif, Retrieved from “https://en.wikipedia.org/w/index.php?title=Exif&oldid=1036988733” on Aug. 30, 2021, 11 pages.

Extensible Metadata Platform, retrieved from “https://en.wikipedia.org/wiki/Extensible_Metadata_Platform” on Aug. 30, 2021, 7 pages.

Georg Haaser et al., CoSMo: Intent-based composition of shader modules, Published in: 2014 International Conference on Computer Graphics Theory and Applications (GRAPP), Date of Conference: Jan. 5-8, 2014, 11 pages.

Jiazhou Chen et al., Importance-Driven Composition of Multiple Rendering Styles, Published in: 2011 12th International Conference on Computer-Aided Design and Computer Graphics, Date of Conference: Sep. 15-17, 2011,8 pages.

Learn How to Edit Like Your Favorite Photographers, PixelPeeper.io, Sep. 9, 2021, 9 pages.

M. Berekovic, P. Pirsch et al., Architecture of an Image Rendering Co-Processor for MPEG-4 Visual Compositing, Journal of VLSI signal processing systems for signal, image and video technology vol. 31, pp. 157-171, 2002, 15 pages.

Matis Hudon et al., Automatic light compositing using rendered images, Published in: 2016 Digital Media Industry & Academic Forum (DMIAF), 4 pages.

Pixelpeeper.Io, Sep. 9, 2021, 9 pages.

Tim Borer et al: “Perceptual Uniformity for High-Dynamic-Range Television Systems”, SMPTE Motion Imaging Journal, vol. 125, No. 8, Oct. 1, 2016 (Oct. 1, 2016).

What is EXIF Data and How You Can Remove it From Your Photos, retrieved from “https://photographylife.com/what-is-exif-data” on Aug. 30, 2021, 16 pages.

XMP Tags, https://exiftool.org/TagNames/XMP.html, retrieved on Sep. 9, 2021, 81 pages.

* cited by examiner

ENCODING AND DECODING MULTIPLE-INTENT IMAGES AND VIDEO USING METADATA

CROSS REFERENCE TO RELATED APPLICATIONS

This application is the U.S. National stage entry of International Patent Application No. PCT/US2022/044899 filed Sep. 27, 2022, which claims priority to U.S. Provisional Application No. 63/251,427, filed Oct. 1, 2021 and European Patent Application No. 21208445.3, filed Nov. 16, 2021, all of which is incorporated herein by reference in its entirety.

FIELD OF THE DISCLOSURE

This application relates generally to systems and methods of image encoding and decoding.

BACKGROUND

Pierre Andrivon et al.: “SEI message for Colour Mapping Information”, Joint Collaborative Team on Video Coding (JCT-VC) of ITU-T SG 16 WP 3 and ISO/IEC JTC 1/SC 29/WG 11, 17$^{th}$ Meeting: Valencia, ES, 27 Mar.-4 Apr. 2014, no. JCTVC-Q0074, 2 Apr. 2014, XP030239839, proposes a colour mapping side information in an SET message that guarantees smooth colour space transition with regards to upcoming HDTV and multi-phases UHDTV services deployment. It is stated that the proposed mapping helps preserving artistic intent of the content produced by studios while maintaining differentiation between TV sets manufacturers. This idea was first exposed in JCTVC-N0180. The proposed SET message intent was clarified in JCTVC-00363. Besides, complexity concerns have been dealt with a simplification of the colour mapping model in JCTVC-P0126. Finally, editorial issues and synchronization aspects are addressed in this proposal. A software is supplied to identify proposed model parameters. Implementation is provided in HM-13.0+RExt-6.0 encoders and decoders. When the proposed colour mapping information SEI message is present, colour mapping is applied to the decoded output pictures.

US 2016/261889 A1 discloses an image processing apparatus and a method that can easily improve encoding efficiency. A setting unit configured to set additional information including packing information related to packing processing of rearranging each pixel data of RAW data that is image data before demosaicing processing is performed according to the degree of correlation, and an encoding unit configured to encode the RAW data subjected to the packing processing, and generate a bit stream including obtained encoded data and the additional information set by the setting unit are included.

“Study Group Report High-Dynamic-Range (HDR) Imaging Ecosystem”, SMPTE Technical Committee (TC) 10E SG, 19 Sep. 2015, XP055250336, proposes definitions for High Dynamic Range (HDR) and related technologies, describes current gaps in the ecosystems for the creation, delivery and display of HDR related content, identifies existing standards that may be impacted by an HDR ecosystem including Wide Color Gamut (WGC), and identifies areas where implementation issues may need further investigation. This report focuses on professional applications, while it does not explicitly discuss delivery to the home.

US 2016/254028 A1 discloses methods and systems for generating and applying scene-stable metadata for a video data stream. A video data stream is divided or partitioned into scenes and a first set of metadata may be generated for a given scene of video data. The first set of metadata may be any known metadata as a desired function of video content (e.g., luminance). The first set of metadata may be generated on a frame-by-frame basis. Scene-stable metadata is generated that may be different from the first set of metadata for the scene. The scene-stable metadata is generated by monitoring a desired feature with the scene and is used to keep the desired feature within an acceptable range of values. This may help to avoid noticeable and possibly objectionably visual artifacts upon rendering the video data.

WO 2020/264409 A1 discloses apparatus and methods for providing solutions to the problem of preserving original creative intent for video playback on a target. A video bitstream includes metadata with a flag indicative of creative intent for a target display. This metadata includes numerous fields that denote characteristics such as content type, content sub-type, intended white point, whether or not to use the video in Reference Mode, intended sharpness, intended noise reduction, intended MPEG noise reduction, intended Frame Rate Conversion, intended Average Picture Level, and intended color. This metadata is designed to make it effortless for the content creators to tag their content. The metadata can be added to the video content at multiple points, the status of the flag is set to TRUE or FALSE to indicate whether the metadata was added by the content creator or a third party.

BRIEF SUMMARY OF THE DISCLOSURE

The invention is defined by the independent claims. The dependent claims concern optional features of some embodiments of the invention. When encoding an image of a scene captured using digital devices, it is common practice to adjust the captured image by, as examples, adapting the image for viewing in a reference viewing environment and applying aesthetic adjustments such as enhanced contrast and color saturation. It would be desirable to be able to transmit the original captured or preprocessed image that represents “reality” as captured by the imaging sensor, and then apply these operations at playback. This would allow for multiple rendering intents: at playback the device can present either the original captured “reality” image, or alternately the device can create the “pleasing” image that is modified from the original captured “reality” image. Accordingly, techniques for encoding and decoding multiple-intent images have been developed.

Various aspects of the present disclosure relate to devices, systems, and methods for encoding and decoding one or more multiple-intent images.

In one exemplary aspect of the present disclosure, there is provided a method for encoding a multiple-intent image. The method comprises obtaining an image for encoding as the multiple-intent image, applying at least one appearance adjustment to the image, generating metadata that characterizes the at least one appearance adjustment, and encoding the image and metadata as the multiple-intent image.

In another exemplary aspect of the present disclosure, there is provided a method for decoding a multiple-intent image. The method comprises obtaining the multiple-intent image along with metadata that characterizes at least one appearance adjustment between the multiple-intent image and an alternative version of the multiple-intent image, obtaining a selection of the alternative version of the multiple-intent image, and using the metadata, applying, to the multiple-intent image, an inverse of the at least one appearance adjustment to recover the alternative version of the multiple-intent image.

In another exemplary aspect of the present disclosure, there is provided a method for providing a multiple-intent image. The method comprises obtaining an original image for encoding as a multiple-intent image, generating metadata that characterizes at least one appearance adjustment to the original image, encoding the original image and metadata as a multiple-intent image, and providing the multiple-intent image.

In another exemplary aspect of the present disclosure, there is provided a non-transitory computer-readable medium storing instructions that, when executed by a processor, cause the processor to perform operations comprising obtaining an image for encoding as the multiple-intent image, applying at least one appearance adjustment to the image, generating metadata that characterizes the at least one appearance adjustment, and encoding the image and metadata as the multiple-intent image.

In another exemplary aspect of the present disclosure, there is provided a non-transitory computer-readable medium storing instructions that, when executed by a processor, cause the processor to perform operations comprising obtaining the multiple-intent image along with metadata that characterizes at least one appearance adjustment between the multiple-intent image and an alternative version of the multiple-intent image, obtaining a selection of the alternative version of the multiple-intent image, and using the metadata, applying, to the multiple-intent image, an inverse of the at least one appearance adjustment to recover the alternative version of the multiple-intent image.

In another exemplary aspect of the present disclosure, there is provided a non-transitory computer-readable medium storing instructions that, when executed by a processor, cause the processor to perform operations comprising obtaining an original image for encoding as a multiple-intent image, generating metadata that characterizes at least one appearance adjustment to the original image, encoding the original image and metadata as a multiple-intent image, and providing the multiple-intent image.

In this manner, various aspects of the present disclosure provide for the encoding, decoding and provision of multiple-intent images and video, and effect improvements in at least the technical fields of image encoding, image decoding, image projection, image display, holography, signal processing, and the like.

DESCRIPTION OF THE DRAWINGS

These and other more detailed and specific features of various embodiments are more fully disclosed in the following description, reference being had to the accompanying drawings, in which.

DETAILED DESCRIPTION

This disclosure and aspects thereof can be embodied in various forms, including hardware, devices or circuits controlled by computer-implemented methods, computer program products, computer systems and networks, user interfaces, and application programming interfaces; as well as hardware-implemented methods, signal processing circuits, memory arrays, application specific integrated circuits (ASICs), field programmable gate arrays (FPGAs), and the like. The foregoing is intended solely to give a general idea of various aspects of the present disclosure, and does not limit the scope of the disclosure in any way.

In the following description, numerous details are set forth, such as optical device configurations, timings, operations, and the like, in order to provide an understanding of one or more aspects of the present disclosure. It will be readily apparent to one skilled in the art that these specific details are merely exemplary and not intended to limit the scope of this application.

Figure 1:
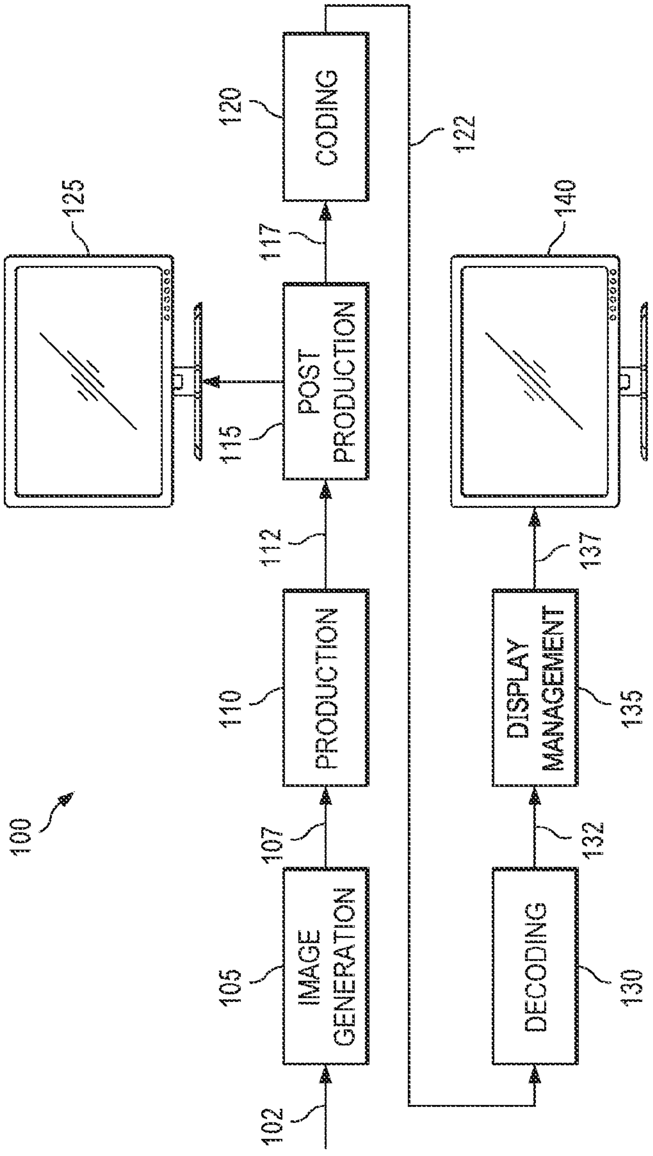
FIG. 1 depicts an example process for image encoding and decoding pipelines.

FIG. 1 depicts an example process of an image delivery pipeline (100) showing various stages from image capture to image content display. An image (102), which may include a sequence of video frames (102), is captured or generated using image generation block (105). Image (102) may be digitally captured (e.g., by a digital camera) or generated by a computer (e.g., using computer animation) to provide image data (107). Alternatively, image (102) may be captured on film by a film camera. The film is converted to a digital format to provide image data (107). In a production phase (110), image data (107) is edited to provide an image production stream (112).

The image data of production stream (112) is then provided to a processor (or one or more processors such as a central processing unit (CPU)) at block (115) for post-production editing. Block (115) post-production editing may include adjusting or modifying colors or brightness in particular areas of an image to enhance the image quality or achieve a particular appearance for the image in accordance with the image creator's creative intent. This is sometimes called "color timing" or "color grading." Methods described herein may be performed by the processor at block (115). Other editing (e.g., scene selection and sequencing, image cropping, addition of computer-generated visual special effects, etc.) may be performed at block (115) to yield a final version (117) of the production for distribution. During post-production editing (115), the image, or video images, is viewed on a reference display (125). Reference display (125) may, if desired, be a consumer-level display or projector.

Following post-production (115), image data of final production (117) may be delivered to encoding block (120) for delivering downstream to decoding and playback devices such as computer monitors, television sets, set-top boxes, movie theaters, and the like. In some embodiments, coding block (120) may include audio and video encoders, such as those defined by ATSC, DVB, DVD, Blu-Ray, and other delivery formats, to generate coded bit stream (122). In a receiver, the coded bit stream (122) is decoded by decoding unit (130) to generate a decoded signal (132) representing an identical or close approximation of signal (117). The receiver may be attached to a target display (140) which may have completely different characteristics than the reference display (125). In that case, a display management block (135) may be used to map the dynamic range of decoded signal (132) to the characteristics of the target display (140) by generating display-mapped signal (137). Additional methods described herein may be performed by the decoding unit (130) or the display management block (135). Both the decoding unit (130) and the display management block (135) may include their own processor or may be integrated into a single processing unit. While the present disclosure refers to a target display (140), it will be understood that this is merely an example. It will further be understood that the target display (140) can include any device configured to display or project light; for example, computer displays, televisions, OLED displays, LCD displays, quantum dot displays, cinema, consumer, and other commercial projection systems, heads-up displays, virtual reality displays, and the like.

When capturing a scene using digital devices, the realistic, scene-referred radiometry is rarely transferred directly to produce an image. Instead, it is common practice for the original electronic manufacturer (OEM) or software application designer of the device to adjust the image by, as examples, adapting the image for viewing in a reference viewing environment, such as a dim surround and D65 illumination, and applying aesthetic adjustments such as enhanced contrast and color saturation. These and other adjustments create a preferred rendering of reality that is deemed pleasing to consumers.

Currently, these operations are lossy in two ways. First, the parameters used to apply the operations are not transmitted, and second, the pixel operations may be lossy due to non-linear clipping and quantization, non-invertible operations, unknown algorithms, or unknown order of operations.

It would be desirable instead to be able to transmit the original captured/preprocessed image that represents "reality" as captured by the imaging sensor, and then apply these operations at playback. This would allow for multiple rendering intents: at playback the device can present either the original captured "reality" image, or alternately the device can create the "pleasing" image that is modified from the original captured "reality" image.

It would also be desirable to allow transmitting such content in a backwards-compatible way. In this approach, the modifications to create the "pleasing" image can be applied during capture, and the appropriate parameters transmitted to a playback device to allow it to invert the modifications thus restoring the original captured "reality" image.

Figure 2:
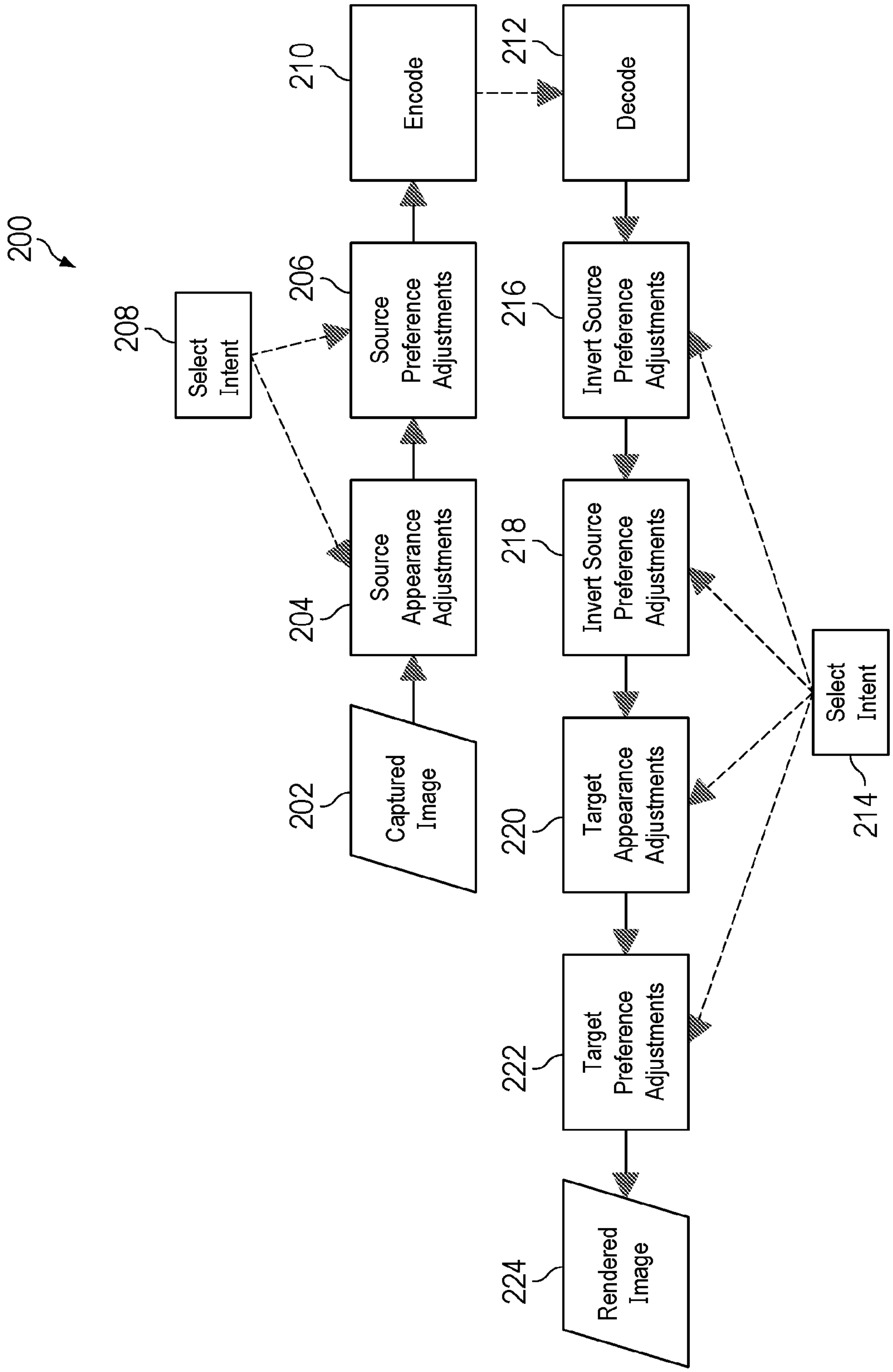
FIG. 2 depicts an example process for encoding and decoding multiple-intent images and video.

FIG. 2 provides a method (200) to allow for encoding and decoding of images with multiple intents using metadata. The method (200) may be performed by, for example, the processor as part of block (115) and/or block (120) for encoding and as part of block (130) and/or block (135) for decoding.

At step (202), an image is captured. In digital-capture devices, an exposed scene is transferred to raw sensor values in a one-channel representation. Through a process known as demosaicing, the one-channel image representation is expanded into a tricolor representation with three channels, for example: red, green, and blue (RGB). There are numerous approaches to demosaicing, any of which would be sufficient in the embodiments disclosed herein.

To perfectly capture the colorimetry of a scene, the spectral sensitivities of the capture device should match the spectral sensitivities of the viewer. In practice, these often do not match exactly but are instead approximated using a 3×3 matrix transform to convert sensor sensitivities to some set of desired RGB primaries. Conventionally, during this step, the camera spectral sensitivities are not transmitted with the content, which makes this process lossy. In one embodiment of this invention, the camera spectral sensitivities as well as the 3×3 matrix transformation that were applied are transmitted with the content, allowing a playback device to either apply, or invert, the conversion from sensor output to specified RGB primaries. Step (202) may include, as non-limiting examples, reading single-channel values from a sensor, applying a demosaicing scheme to create a three-color-channel (e.g., RGB) image, optionally applying a 3×3 transformation to conform image sensitivities to those of desired tricolor (e.g., RGB) primaries. Step (202) may also include measuring a capture surround luminance (e.g., a level of ambient light in the capture environment).

Once the desired RGB makeup of the captured image is determined, the values may be conformed to a specified reference white point. The image may be conformed to one of the standardized white points (D50, D65, etc.) through the Von Kries adaptation transformation. This process involves (a) estimating the capture environment surround illuminance and white point and (b) applying a correction to the image to achieve a color match for an observer in a specified reference viewing environment (e.g., an environment with a known white point and surround illumination). The methodology employed for adjusting images to suit the observer's state of adaptation in a chromatic ambient surround is outlined in PCT Application No. PCT/US2021/027826, filed Apr. 16, 2021, and in PCT Application No. PCT/US2021/029476, filed Apr. 27, 2021, each of which is hereby incorporated by reference in its entity and for all purposes. At step (204), one or more optional source appearance adjustments can be applied to the captured imaged including, but not limited to, white balance adjustments, color correction adjustments, optical-optical transfer function (OOTF) adjustments. Step (204) may include calculating a non-linear optical-optical transfer function (OOTF) to map from the measured capture surround luminance to a reference reviewing environment. The order of the white point adjustment and the 3×3 matrix may vary. Calculation and application of the optical-optical transfer function (OOTF) may establish an image's rendering intent on standard display devices. In practice, the OOTF is applied to map the image from the viewing environment at capture to display in the reference viewing environment. Application of the OOTF today is a lossy operation, which makes inversion of the OOTF at playback difficult. As with the white point adjustment, in a first step (a) the surround illuminance of the capture environment can be estimated and in a second step (b) the image can be corrected to achieve a match for an observer in a reference environment.

At step (206), one or more optional source preference adjustments can be applied to the captured image including, but not limited to, contrast adjustments, color saturation adjustments including overall color saturation adjustments and/or individual color saturation adjustments, slope-offset-power-Tmid adjustments in the tone curve, and other tone curve trims and adjustments. As used herein, "mid" refers to the average, in a perceptually quantized (PQ) encoded image, of the maxRGB values of the image, where each pixel has its own maxRGB value that is equal to that pixel's greatest color component value (R, G, or B). In other words, whichever color component of a pixel has the greatest value, is the maxRGB value for that pixel and the average of the maxRGB values across a PQ-encoded image is the image's "mid." "T-mid" may refer to a "target mid," which may be the "mid" value that a user or content creator desires in the final image. In some embodiments, the individual color saturation adjustments may include saturation adjustments in 6 different colors, which may be referred to as "six-vector adjustments."

Step (206) and step (208) may involve receiving a selection of intent in step (208) from a user, where that selection of intent specifies what source appearance and source preference adjustments are made, the coefficients of such adjustments, what portions of the image the adjustments are applied to, etc.

It is common practice for OEMs or software applications to apply source preference adjustments to captured images. These alterations are purely aesthetic and typically put in place to render images with higher levels of contrast and color saturation. In various embodiments of the present disclosures, these preference alterations determined by the OEM are transmitted as metadata with the content and applied at playback in the same manner as the source appearance metadata. In each case there is a first step (a) of calculating or specifying the desired amount of correction to apply and (b) applying the correction using a parameterized function. Both (a) and (b) are transmitted as metadata, allowing a playback device to have full flexibility of rendering either a "pleasing" or "reality" image, and allowing full flexibility of the capture device of transmitting either a "pleasing" or "reality" image.

As described herein, one benefit of the various embodiments disclosed herein is that all adjustments to the three-channel image can be encoded as metadata and sent alongside the content to the playback device for application. In one embodiment, the OEM or encoding device can decide to apply no adjustments for both appearance and preference in order to produce a "reality" image.

At step (210), the image, as modified in step (206) and step (208), may be encoded. Step (210) may include encoding the image for delivering downstream to decoding and playback devices such as computer monitors, television sets, set-top boxes, movie theaters, and the like. In some embodiments, encoding step (210) may include audio and video encoders, such as those defined by ATSC, DVB, DVD, Blu-Ray, and other delivery formats, to generate a coded bit stream. In addition to encoding the image, step (210) may include creating and/or encoding metadata that characterizes the source appearance adjustments applied in step (204) and the source preference adjustments applied in step (206). The metadata may include metadata associated with the source appearance adjustments such as scene white point, specified in x,y coordinates (or some other system); scene surround brightness (e.g., information about the estimated capture environment), specified in lux (or some other system); coefficients of white point adjustment matrix that was applied; coefficients of 3×3 color matrix that was applied, coefficients of parameterized OOTF that was applied; the spectral sensitivities of the sensor used to calculate the 3×3 matrix; and coefficients or other information for other enhancements that are applied in step (204). Additionally, the metadata may include metadata associated with the source preference adjustments such as coefficients for contrast enhancements, such as slope-offset-power-Tmid contrast adjustments; coefficients for saturation enhancements; coefficients for individual color saturation adjustments; coefficients for tone curve trims; and coefficients for other enhancements that are applied in step (206).

At step (212), the encoded image and metadata may be decoded. At step (214) a selection of a desired rendering intent may be obtained. As a first example, a selection to render the image as modified by the source appearance adjustments of step (204) and source preference adjustments may be obtained. As second and third examples, a selection to render the image as if it had been modified by the source appearance adjustments of step (204) but hadn't been modified by the source preference adjustments of step (206) (or vice-versa) may be obtained. As a fourth example, a selection to render the image as if it had not been modified by the source appearance adjustments of step (204) or the source preference adjustments of step (206) may be obtained. In the fourth example, the image captured in step (202) may be partially or wholly recovered. In some embodiments, the selection of rendering intent obtained in step (214) may be based on a user selection at the playback device. In some embodiments, a default rendering intent may be specified during the encoding process and, absent contrary user input, that default rendering intent may be selected. In some embodiments, the default rendering intent may involve rendering the image with the source appearance adjustments of step (204) and the source preference adjustments of step (206) applied.

At optional step (216), the metadata may be used to calculate inverted source preference adjustments. When applied, the inverted source preference adjustments of step (216) may undo some or all of the source preference adjustments of step (206), with user selections and default rendering intents identifying which of the source preference adjustments are inverted.

At optional step (218), the metadata may be used to calculate inverted source appearance adjustments. When applied, the inverted source appearance adjustments of step (218) may undo some or all of the source appearance adjustments of step (204), with user selections and default rendering intents identifying which of the source appearance adjustments are inverted.

At optional step (220), target appearance adjustments may be calculated and applied. The target appearance adjustments may include, as non-liming examples, measuring a display surround luminance (e.g., a level of ambient light in the display environment) and then calculating and applying a non-linear optical-optical transfer function (OOTF) to map from the reference viewing environment to the measured display surround luminance (e.g., the actual viewing environment).

At optional step (222), target preference adjustments may be calculated and applied. The target preference adjustments may include, as non-liming examples, contrast adjustments, color saturation adjustments, slope-offset-power-Tmid adjustments, individual color saturation adjustments, and tone curve trims.

At step (224), the image may be rendered. As examples, the image may be projected, displayed, saved to storage, transmitted to another device, or otherwise utilized.

In some embodiments, inverting of the source adjustments and applying the target adjustments are combined into a single processing step, and the adjustments are calculated accordingly. In other words, some or all of steps 216, 218, 220, and 220 may be combined.

In some embodiments, the rendering intent selected in step (208) is for a "reality" image and steps (204 and 206) are essentially bypassed. This corresponds to distribution of the "reality" image. The metadata in such embodiments would indicate that no source appearance adjustments and no source preference adjustments were made.

In some other embodiments, some source appearance and preference adjustments are applied (e.g., in steps (204 and 206)), producing a "pleasing" image. The metadata in such embodiments may indicate the amount and type of source appearance and preference adjustments have been applied. The metadata may include multiple values, each corresponding to a parameter controlling a particular function that was applied as source appearance and/or preference adjustments. These functions can be inverted (or approximately inverted) by the playback device by knowing the exact function that was applied, the order that it was applied in, and the parameters controlling the strength of the functions. The metadata may be configured to include the information needed by the playback device to invert (or approximately invert) these functions.

If desired, the metadata created in step (210) may be used to transmit a "desired rendering intent" for the content, which specifies a default value for how the image is processed at playback (whether the "reality" image is displayed or the "pleasing" image is displayed). This can be a Boolean value or a scale that varies continuously between the two. The playback device interprets this metadata as the "desired rendering intent" and inverts the source appearance and preference adjustments according to the source adjustment metadata, and also applies the target appearance adjustments according to the viewing environment. If desired, the "desired rendering intent" specified in the metadata may be overridden upon receipt of user input.

Figure 3:
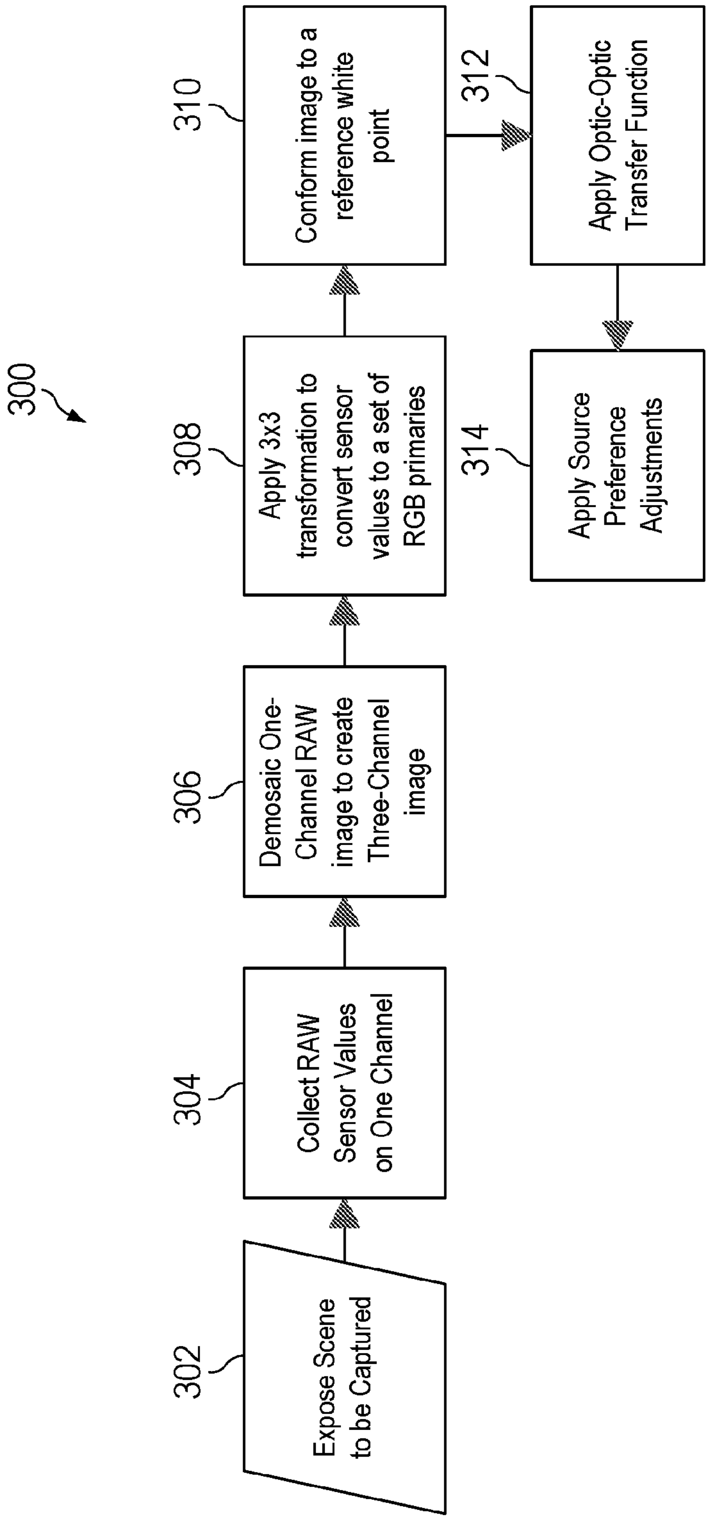
FIG. 3 depicts an example process for encoding multiple-intent images and video.

FIG. 3 provides a method (300) to allow for encoding of images with multiple intents using metadata. The method (300) may be performed by, for example, the processor as part of block (115) and/or block (120) for encoding.

At step (302), an image is captured by exposing the scene to a sensor. At step (304), raw sensor values for each color channel are collected. At step (306), a demosaicing algorithm or process may be used to convert the raw sensor values from each color channel into a multi-channel color image (e.g., a three-channel color image having three color primaries). At step (308), a 3×3 matrix transformation may be applied to the multi-channel color image to convert the raw sensor values into a set of desired color primaries, such as RGB color primaries. The 3×3 matrix transformation of step (308) may serve to account for differences in the sensitivity of the sensor between the different color channels. At step (310), the image may be conformed to a reference white point, with one or more white balance adjustments, color correction adjustments, or the like. At step (312), an optical-optical transfer function (OOTF) may be applied to, as an example, map from a surround luminance in the capture environment to the luminance of a reference reviewing environment. At step (314), one or more source preference adjustments may be applied including but not limited to, contrast adjustments, color saturation adjustments, slope-offset-power-Tmid adjustments, individual color saturation adjustments, and tone curve trims. Following step (314), the image may be encoded and metadata generated, to enable the potential inversion of any source preference and source appearance adjustments made during the method (300).

Figure 4:
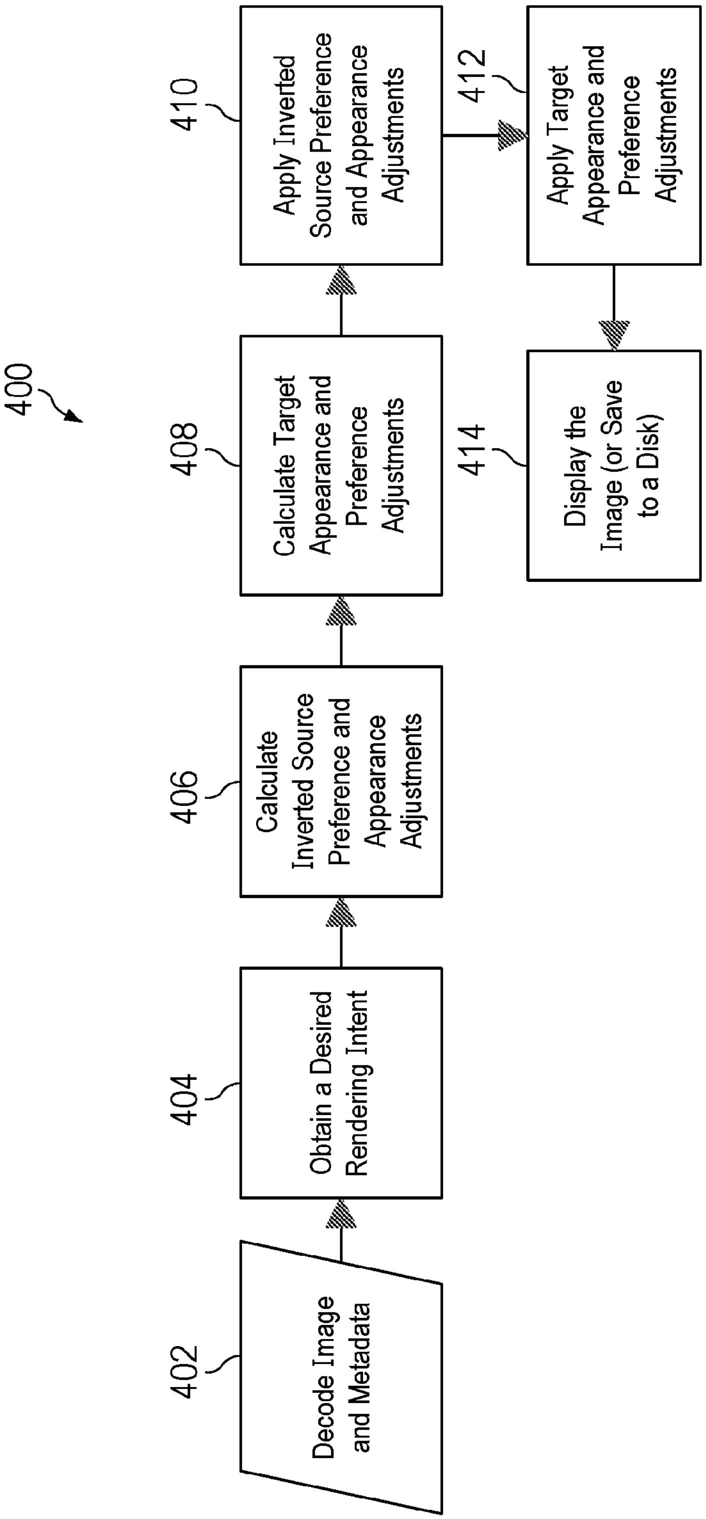
FIG. 4 depicts an example process for decoding multiple-intent images and video.

FIG. 4 provides a method (400) to allow for decoding of images with multiple intents using metadata. The method (400) may be performed by, for example, the processor as part of block (130) and/or block (135) for decoding.

At step (402), a multiple-intent image and its corresponding metadata are decoded.

After decoding the image and metadata on the playback device, there are multiple options with regard to the rendering intent of the displayed image. In one embodiment, the selected (or preferred) intent exists within the metadata as a flag or profile that guides the operations of the target/receiving device to accommodate for the desired adjustments in both the appearance and preference realms. In another embodiment, the final rendered image could involve no accommodation for appearance or preference adjustments. Another embodiment involves the rendered image receiving accommodations for appearance phenomena, but not preference (and vice versa). These intents do not have to be binary, as it is possible for partial application of the determined adjustments for appearance and preference phenomena.

At step (404), a desired rendering intent is obtained, e.g., from a default specified in the metadata, from user input, etc.

Once the intent has been established for the target device, the source-image-based adjustments may need to be inverted. Both the appearance and preference adjustments made to the image on the source side of the pipeline have been decoded from the accompanying metadata file. Based on the applied adjustments known from the metadata, the inverses can be determined if needed. In an embodiment where the OEM decides to not apply any image adjustments, there is no need to calculate the inverse of the source and the target can be applied directly. For all other embodiments, the inverse adjustments can be calculated if it is desired not to apply source-image-based adjustments (e.g., if it is desired to invert the source-image-based adjustments).

At step (406), inverted source preference and appearance adjustments are calculated, e.g., based on the metadata.

Because the source preference adjustments are applied last before encoding, they may need to be inverted first after decoding. The inverse preference adjustments undo any additional image processing done for aesthetic purposes specified by the metadata, such as, in one embodiment, altering image contrast and saturation. Following this, the source appearance adjustments are inverted through metadata describing the source-to-display OOTF, as well as any adjustments made to correct for the presence of ambient and/or chromatic light.

Once the source adjustments have been inverted, the target adjustments can be applied. In a similar vein to the source appearance adjustments, the target appearance adjustments leverage information about the target viewing environment and standard observer's state of adaptation to alter image white point, luminance, and color saturation to deliver an appropriate rendition of the image. The viewer's proximity to the screen will determine how much influence is exerted by the screen versus that exerted by the environment (example techniques are described in PCT Patent Application No. PCT/US2021/027826, filed Apr. 16, 2021, which is hereby incorporated in its entirety for all purposes). Alternatively, viewing distances recommended by standards can be used to calculate screen size influence on adaptation. In one embodiment, additional adjustments can be applied to personalize the appearance phenomena to the individual viewer. These adjustments include correcting for an individual's contrast sensitivity function, considerations from metamerism, and potential degree of color blindness. Further image enhancements can be applied on the target end to accommodate for the preference of the OEM.

At step (408), target appearance and preference adjustments are calculated, e.g., based on the desired rendering intent, information about the target display environment such as surround luminance, etc.

At step (410), inverted source preference and appearance adjustments are applied to the decoded image, e.g., to undo the source preference and appearance adjustments made during the method (300).

At step (412), target appearance and preference adjustments are applied to the decoded image.

At step (414), the decoded image with the target appearance and preference adjustments applied is displayed, saved to a disk, conveyed to another device or party, or otherwise utilized.

The above encoding systems, decoding systems, and methods may provide for encoding and decoding multiple-intent images and video using metadata. Systems, methods, and devices in accordance with the present disclosure may take any one or more of the following configurations.

(1) A method of encoding a multiple-intent image, the method comprising: obtaining an image for encoding as the multiple-intent image, applying at least one appearance adjustment to the image, generating metadata that characterizes the at least one appearance adjustment, and encoding the image and metadata as the multiple-intent image.

(2) The method according to (1), wherein the metadata characterizes the at least one appearance adjustment to an extent sufficient that the metadata can be used to invert the at least one appearance adjustment.

(3) The method according to (1) or (2), wherein applying the at least one appearance adjustment comprises converting sensor values to color values.

(4) The method according to any one of (1) to (3), wherein applying the at least one appearance adjustment comprises using a 3×3 matrix to convert sensor values to color values and wherein the metadata comprises coefficients of the 3×3 matrix.

(5) The method according to any one of (1) to (4), wherein applying the at least one appearance adjustment comprises estimating a capture environment surround luminance and white point and applying a white point correction based on the estimated capture environment surround luminance and white point.

(6) The method according to (5), wherein the metadata comprises the estimated capture environment surround luminance and white point.

(7) The method according to any one of (1) to (4), wherein applying the at least one appearance adjustment comprises estimating a capture environment surround luminance and applying an optical-optical transfer function (OOTF) to prepare the image for rendering on a reference display device based in part on the estimated capture environment surround luminance.

(8) The method according to (7), wherein the metadata comprises the estimated capture environment surround luminance.

(9) The method according to (7) or (8), wherein the metadata comprises coefficients of the optical-optical transfer function.

(10) The method according to any one of (1) to (9) wherein applying the at least one appearance adjustment comprises applying a saturation enhancement and wherein the metadata comprises coefficients of the saturation enhancement.

(11) The method according to any one of (1) to (10), wherein applying the at least one appearance adjustment comprises applying a contrast enhancement and wherein the metadata comprises coefficients of the contrast enhancement.

(12) The method according to any one of (1) to (11), wherein applying the at least one appearance adjustment comprises applying individual color saturation adjustments and wherein the metadata comprises coefficients of the individual color saturation adjustments.

(13) The method according to any one of (1) to (12), wherein applying the at least one appearance adjustment comprises applying a slope-offset-power-Tmid enhancement and wherein the metadata comprises coefficients of the slope-offset-power-Tmid enhancement.

(14) The method according to any one of (1) to (13), wherein applying the at least one appearance adjustment comprises applying an enhancement and wherein the metadata comprises coefficients of the enhancement.

(15) The method according to any one of (1) to (14), wherein applying the at least one appearance adjustment comprises applying tone curve trims and wherein the metadata comprises coefficients of the tone curve trims.

(16) The method according to any one of (1) to (15), wherein the multiple-intent image comprises a video frame in a video.

(17) A method of decoding a multiple-intent image, the method comprising: obtaining the multiple-intent image along with metadata that characterizes at least one appearance adjustment between the multiple-intent image and an alternative version of the multiple-intent image, obtaining a selection of the alternative version of the multiple-intent image, and using the metadata, applying, to the multiple-intent image, an inverse of the at least one appearance adjustment to recover the alternative version of the multiple-intent image.

(18) A method, the method comprising: obtaining an original image for encoding as a multiple-intent image, generating metadata that characterizes at least one appearance adjustment to the original image, encoding the original image and metadata as a multiple-intent image, and providing the multiple-intent image.

(19) The method according to (18), further comprising: receiving, at a decoder, the multiple-intent image, obtaining, at the decoder, a selection of a first rendering intent, based on the selection of the first rendering intent, decoding the multiple-intent image by applying the at least one appearance adjustment to the original image, and providing the original image with the at least one appearance adjustment applied.

(20) The method according to (18) or (19), further comprising: obtaining, at the decoder, a selection of a second rendering intent, based on the selection of the second rendering intent, decoding the multiple-intent image without applying the at least one appearance adjustment to the original image, and providing the original image without the at least one appearance adjustment applied.

(21) The method according to (18), wherein the metadata characterizes the at least one appearance adjustment to an extent sufficient that the metadata can be used to invert the at least one appearance adjustment.

(22) The method according to any one of (18) to (21), wherein the at least one appearance adjustment comprises converting sensor values to color values.

(23) The method according to any one of (18) to (22), wherein the at least one appearance adjustment comprises using a 3×3 matrix to convert sensor values to color values and wherein the metadata comprises coefficients of the 3×3 matrix.

(24) The method according to any one of (18) to (23), wherein the at least one appearance adjustment comprises estimating a capture environment surround luminance and white point and applying a white point correction based on the estimated capture environment surround luminance and white point.

(25) The method according to (24), wherein the metadata comprises the estimated capture environment surround luminance and white point.

(26) The method according to any one of (18) to (23), wherein the at least one appearance adjustment comprises estimating a capture environment surround luminance and applying an optical-optical transfer function (OOTF) to prepare the image for rendering on a reference display device based in part on the estimated capture environment surround luminance.

(27) The method according to (26), wherein the metadata comprises the estimated capture environment surround luminance.

(28) The method according to (26) or (27), wherein the metadata comprises coefficients of the optical-optical transfer function.

(29) The method according to any one of (18) to (28), wherein the at least one appearance adjustment comprises applying a saturation enhancement and wherein the metadata comprises coefficients of the saturation enhancement.

(30) The method according to any one of (18) to (29), wherein the at least one appearance adjustment comprises applying a contrast enhancement and wherein the metadata comprises coefficients of the contrast enhancement.

(31) The method according to any one of (18) to (30), wherein the at least one appearance adjustment comprises applying individual color saturation adjustments and wherein the metadata comprises coefficients of the individual color saturation adjustments.

(32) The method according to any one of (18) to (31), wherein the at least one appearance adjustment comprises applying a slope-offset-power-Tmid enhancement and wherein the metadata comprises coefficients of the slope-offset-power-Tmid enhancement.

(33) The method according to any one of (18) to (32), wherein the at least one appearance adjustment comprises applying an enhancement and wherein the metadata comprises coefficients of the enhancement.

(34). The method according to any one of (18) to (33), wherein the at least one appearance adjustment comprises applying tone curve trims and wherein the metadata comprises coefficients of the tone curve trims.

(35) The method according to any one of (18) to (34), wherein the multiple-intent image comprises a video frame in a video.

(36) A non-transitory computer-readable medium storing instructions that, when executed by an electronic processor, cause the electronic processor to perform operations according to any one of (1) to (35).

(37) An image delivery system for delivering a multiple-intent image, the image delivery system comprising a processor configured to encode the multiple-intent image according to any one of (1) to (16) and (18) to (35).

(38) An image decoding system for receiving and decoding a multiple-intent image, the image decoding system comprising a processor configured to encode the multiple-intent image according to (17).

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as “a,” “the,” “said,” etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments incorporate more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A method of decoding a multiple-intent image, the multiple-intent image including a representation of an image in a reference viewing environment and metadata for transforming the included representation to alternative versions of the image, the method comprising:

obtaining the multiple-intent image along with metadata that characterizes at least one appearance adjustment between the representation of the image in the reference viewing environment and an alternative version of the image, the metadata being indicative of a surround luminance and white point in a capture environment when having captured the image by an image sensor;

obtaining a selection of a desired rendering intent corresponding to the alternative version of the multiple-intent image, wherein the selected desired rendering intent is of the image as captured by the image sensor; and using the metadata, applying, to the representation of the image in the reference viewing environment, an inverse of the at least one appearance adjustment to recover the alternative version of the multiple-intent image based on the obtained selection, wherein applying the inverse of the at least one appearance adjustment comprises:

calculating inverted source appearance adjustments based on the selected desired rendering intent; and using the calculated inverted source appearance adjustments, applying an inverse of a white point correction based on the metadata indicative of the capture environment surround luminance and white point.

2. The method of claim 1, wherein applying, to the representation of the image in the reference viewing environment, an inverse of the at least one appearance adjustment to recover the alternative version of the multiple-intent image based on the obtained selection comprises:

applying an optical-optical transfer function to the image to map from the surround luminance in the reference viewing environment to the surround luminance of the capture environment.

3. The method of claim 2, wherein the metadata are further indicative of the spectral sensitivity of the image sensor having captured the image and of the coefficients of a 3×3 matrix transformation applied to raw sensor values from the image sensor for correcting differences in the spectral sensitivity of the image sensor between the color channels and wherein applying, to the representation of the image in the reference viewing environment an inverse of the at least one appearance adjustment to recover the alternative version of the multiple-intent image based on the obtained selection further comprises applying an inverse of the 3×3 matrix transformation to the image to retrieve raw sensor values.

4. The method of claim 1, wherein the metadata comprises the desired rendering intent, the desired rendering intent specifying a default value for how the image is to be processed at playback.

5. A method of encoding a multiple-intent image, the multiple-intent image including a representation of an image in a reference viewing environment and metadata for transforming the reference representation to alternative versions of the image, the method comprising:

- obtaining the image for encoding as the multiple-intent image, comprising:
  - capturing a multi-channel color image by exposing a scene to an image sensor in a capture environment and collecting raw sensor values from the image sensor for each color channel; and
  - determining a surround luminance and white point in the capture environment;
- receiving a selection of intent specifying at least one appearance adjustment to apply to the image;
- applying the at least one appearance adjustment to the image to transform the captured image to the representation of the image in the reference viewing environment, comprising:
  - mapping the image from the determined white point in the capture environment to a preferred white point in the reference viewing environment based on the selection of intent; and
  - applying an optical-optical transfer function to the image to map from the surround luminance in the capture environment to a preferred surround luminance of the reference viewing environment based on the selection of intent;
- generating metadata that characterizes the at least one appearance adjustment, the metadata being indicative of the determined surround luminance and white point in the capture environment; and
- encoding the transformed image and metadata as the multiple-intent image.

6. The method of claim 5, wherein applying at least one appearance adjustment to the image further comprises applying a 3×3 matrix transformation to the captured multi-channel color image to convert the collected raw sensor values into a set of desired color primaries, the 3×3 matrix transformation accounting for differences in the spectral sensitivity of the image sensor between the color channels and wherein the metadata are further indicative of the spectral sensitivity of the image sensor having captured the image, and of the coefficients of the 3×3 matrix transformation for correcting differences in the spectral sensitivity of the image sensor between the color channels, such that the metadata are capable of transforming the reference representation to an image approximating the image as captured.

7. The method of claim 5, wherein applying the at least one appearance adjustment comprises applying individual color saturation adjustments and wherein the metadata comprises coefficients of the individual color saturation adjustments.

8. The method of claim 5, wherein applying the at least one appearance adjustment comprises applying a slope-offset-power-Tmid adjustment and wherein the metadata comprises coefficients of the slope-offset-power-Tmid adjustment.

9. The method of claim 5, wherein applying the at least one appearance adjustment comprises applying tone curve adjustments and wherein the metadata comprises coefficients of the tone curve adjustments.

10. The method of claim 5, wherein the multiple-intent image comprises a video frame in a video.

11. The method of claim 5, wherein the metadata characterizes the at least one appearance adjustment to an extent sufficient that the metadata can be used to invert the at least one appearance adjustment.

12. A non-transitory computer-readable medium storing instructions that, when executed by an electronic processor, cause the electronic processor to perform operations to decode a multiple-intent image, the multiple-intent image including a representation of an image in a reference viewing environment and metadata for transforming the included representation to alternative versions of the image, the operations comprising:

- obtaining the multiple-intent image along with metadata that characterizes at least one appearance adjustment between the representation of the image in the reference viewing environment and an alternative version of the image, the metadata being indicative of a surround luminance and white point in a capture environment when having captured the image by an image sensor;
- obtaining a selection of a desired rendering intent corresponding to the alternative version of the multiple-intent image, wherein the selected desired rendering intent is of the image as captured by the image sensor; and
- using the metadata, applying, to the representation of the image in the reference viewing environment, an inverse of the at least one appearance adjustment to recover the alternative version of the multiple-intent image based on the obtained selection,
- wherein applying the inverse of the at least one appearance adjustment comprises:
  - calculating inverted source appearance adjustments based on the selected desired rendering intent; and
  - using the calculated inverted source appearance adjustments, applying an inverse of a white point correction based on the metadata indicative of the capture environment surround luminance and white point.

13. The method of claim 1, wherein applying, to the representation of the image in the reference viewing environment, the inverse of the at least one appearance adjustment to recover the alternative version of the multiple-intent image based on the obtained selection comprises:

- applying an inverse of contrast adjustments, individual color saturation adjustments, a slope-offset-power-Tmid adjustment, tone curve adjustments, or a combination thereof, wherein the metadata characterizes the at least one appearance adjustment.

14. The method of claim 1, further comprising:

applying, after applying the inverse of the at least one appearance adjustment and to the representation of the image in the reference viewing environment, target appearance adjustments to map the representation of the image in the reference viewing environment to an actual viewing environment of the image.

15. The method of claim 1, wherein applying the at least one appearance adjustment comprises:

calculating an amount of a correction to apply; and applying the correction using a parameterized function, wherein the metadata comprises the amount of the correction and the parameterized function.

16. The method of claim 5, wherein the metadata comprises coefficients of the optical-optical transfer function.

17. The method of claim 1, wherein applying the at least one appearance adjustment comprises applying a saturation enhancement, and wherein the metadata comprises coefficients of the saturation enhancement.

18. The method of claim 1, wherein applying the at least one appearance adjustment comprises applying a contrast enhancement, and wherein the metadata comprises coefficients of the contrast enhancement.

19. The method of claim 1, wherein applying the at least one appearance adjustment comprises applying tone curve trims, and wherein the metadata comprises coefficients of the tone curve trims.

20. The non-transitory computer-readable medium of claim 12, the operations further comprising:

applying, after applying the inverse of the at least one appearance adjustment and to the representation of the image in the reference viewing environment, target appearance adjustments to map the representation of the image in the reference viewing environment to an actual viewing environment of the image.

* * * * *